Figure 1:
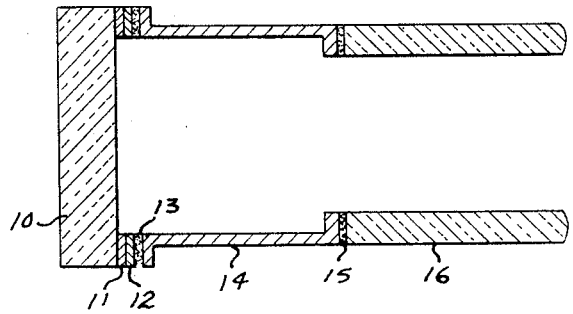

Dec. 1, 1959     W. J. HITCHCOCK     2,915,153
SALT CRYSTAL-TO-GLASS SEAL

Filed Feb. 29, 1956

INVENTOR.
WILLIAM J. HITCHCOCK
BY
Kasper T. Serijan
ATTORNEYS

United States Patent Office 2,915,153
Patented Dec. 1, 1959

2,915,153

SALT CRYSTAL-TO-GLASS SEAL

William J. Hitchcock, Kingston, Mass., assignor to the United States of America as represented by the Secretary of the Air Force Application February 29, 1956, Serial No. 568,679

5 Claims. (Cl. 189—36.5)

This invention relates to a salt crystal-to-glass seal. More particularly, this invention relates to an improved salt crystal-to-glass seal construction embodying the use of an interconnecting deformable silver sleeve for joining the crystal to the glass in a manner such that a bond of improved strength characteristics is obtained.

In salt crystal-to-glass seal constructions wherein it is desired to join an inorganic salt crystal or window to a glass member to form a hermetic seal, the use of an interconnecting deformable metallic sleeve such as a sufficiently thin silver ring is well known, the purpose of said ring being to relieve the strain caused by different thermal expansion properties possessed by the crystal and glass member respectively. Where elevated temperatures and vacuum operation are involved, the strain in the absence of a yielding ring is usually sufficient to cause seal rupture or breakage of either the crystal or glass member or both.

In order to put a relatively thin and easily deformable metal between two materials of unequal coefficient of thermal expansion when they are to be joined in a vacuum-tight manner, said metal being preferably of silver in the form of a cylindrical sleeve, it is common practice to seal one free end of the sleeve to the crystal window using an inorganic salt such as silver chloride as a bonding agent or adhesive therebetween. In this connection, it has been necessary to groove the crystal, said groove being filled with the bonding agent in a plastic state. The end of the sleeve is then inserted into the groove and upon hardening of the silver chloride a seal capable of maintaining a vacuum is obtained as disclosed in U.S. Patent No. 2,543,369.

Although the aforesaid grooved construction is somewhat effective for resisting the tendency of the ring to rupture the seal by pulling away from the crystal surface particularly under conditions of strain wherein appreciable forces may be involved, this approach is not entirely satisfactory in that substantial weakening of the crystal is necessarily involved. When sufficient crystal thickness is available, the grooving operation may not be appreciably detrimental, however, when relatively thin crystal or window elements are involved, the provision of adequate annular recesses on the face thereof is often highly impractical. A need therefore exists for enabling the formation of strong and leak-proof seals between a salt crystal and glass element through an interconnecting metallic sleeve without resorting to the aforesaid grooving procedure and it is the solution of this problem as well as to the provision of a generally stronger and more durable seal construction of the indicated type to which the present application is directed.

It has now been discovered that by treating the juncture forming surface of the salt crystal to provide a triple layer consisting of successive applications of (a) an easily oxidizable metal which does not readily dissolve in silver chloride, (b) a noble metal and (c) silver chloride respectively, and aligning the metallic ring or sleeve in contact with the crystal surface treated in this manner, a highly satisfactory seal construction may be obtained. Not only is the need for grooving the crystal eliminated but a stronger and more durable seal construction is provided thereby. By practicing the method herein disclosed one is able to produce salt crystal-to-glass seals that are strong and vacuum-tight and which result in improved resistance to shock whereby the possibility of damage or breakage to the seal, crystal or glass element is materially minimized. The seal construction and method of the present invention finds wide application in various arts; for example, it is extremely useful in the manufacture of vacuum tubes having a salt crystal window, in thermocouple tubes, and related devices wherein a salt crystal-to-glass hermetic seal through an interconnecting metallic sleeve is deemed feasible.

It is accordingly an object of this invention to provide a novel salt crystal-to-glass seal construction interconnected through an easily deformable metallic sleeve for relieving strain produced by different coefficients of thermal expansion of the salt crystal and glass, said construction being characterized by provision of a stronger sealing bond between the salt crystal surface and the metallic sleeve.

It is another object of the present invention to provide an article of the character described in which the improved bond between the salt crystal and the metallic sleeve is obtained without grooving the crystal or otherwise impairing its strength and optical properties.

It is a further object of the present invention to provide a novel method of producing salt crystal-to-glass hermetic seals interconnected by an easily deformable metal sleeve characterized by the deposition of a multiple bonding layer between the salt crystal and interconnecting sleeve whereby the bond therebetween is significantly strengthened thereby eliminating the need for grooving the crystal surface.

Figure 2:
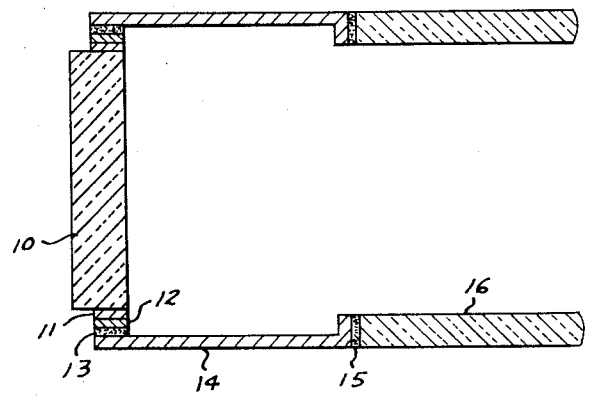

The foregoing objects as well as other objects relating to structural and method details will become apparent from the following description read in conjunction with the accompanying drawing in which corresponding parts are indicated by similar numerals and in which:

Fig. 1 is a fragmentary sectional view showing one embodiment of the salt crystal-to-glass seal wherein the joint is formed peripherally along the face of a cylindrical salt crystal; and Fig. 2 is a fragmentary sectional view of a slightly modified embodiment wherein the seal is formed along the outer edge of a cylindrical salt crystal or window.

Referring now to the figures, the inorganic salt crystal component 10 is illustrated in cylindrical shape it being understood, however, that any desired shape providing a uniform surface may be utilized for the purpose. Inorganic salt crystals consisting of materials such as sodium chloride, potassium chloride, calcium fluoride, lithium fluoride, etc. may be used. In a preferred embodiment of my invention, the inorganic salt component consists of a lithium fluoride prism or window the thickness of which may be varied in accordance with the requirements to be imposed upon the device embodying the seal construction.

The portion of the crystal area to be treated for forming the improved seal in accordance with the present invention is referred to herein as the "juncture surface" and in the embodiments shown in Figs. 1 and 2, the bottom and outer edge surfaces respectively of the crystal surface are utilized as such for illustrative purposes.

Following the usual cleaning and surface preparation procedures applicable to salt crystals, a relatively thin adhesive or bonding layer 11 consisting of a suitable metal or metallic compound is applied, preferably by thermal evaporation within a vacuum over the juncture surface, care being taken to protect the crystal surface which is not to be coated. As a suitable substance for forming this initial layer chromium is preferred although other metals including aluminum, magnesium, nickel, copper, cadmium, and other heavy metals and their derivatives notably the oxides capable of easily forming an oxide film which does not itself dissolve readily in silver chloride may be used. Where the oxide is used, the oxide film is deposited directly on the juncture surface otherwise the desired oxidation of layer 11 may take place spontaneously in some instances or may be effected by known procedures utilizing exposure to an oxidizing atmosphere.

Deposited over layer 11 by direct thermal evaporation or any other suitable means is a second or intermediate metallic adhesive layer 12 consisting of a relatively thin film of either silver or gold. The use of silver is preferred principally because of economic considerations but in either event a tightly adhering permanent bond is established with the initial layer.

A third layer 13 consisting of silver chloride in a plastic state is finally applied thereover and a metallic sleeve 14 preferably of silver is positioned in sealing engagement therewith illustrated by the embodiments shown in Figs. 1 and 2. For best results, it is preferred to adapt the sealing edge of the sleeve to provide more than a knife-edge type contact with the treated crystal surface. This may be accomplished by deflecting the end of the sleeve either inwardly or outwardly, the latter arrangement being shown in Fig. 1. Upon hardening of the silver chloride, the edge of the sleeve pressed therein will be effectively joined to the crystal through the multiple bonding layers thereby forming a hermetic seal capable of maintaining a vacuum over an indefinite period.

The salt crystal-to-glass seal construction is then made complete by joining an appropriate glass member 16 to the remaining free end of sleeve 14 utilizing a silver chloride bonding medium 15 or any other of the conventional methods known to be capable of providing an adequately strong and leak-proof metal-to-glass seal. In Figs. 1 and 2, only a segment of the glass member 16 forming the metal sleeve-to-glass seal is shown. It should be understood, however, that in its entirety the glass member may assume any desired shape and size which is satisfactory for the purpose intended, a commonly used form comprising a glass envelope (not shown) providing a closed chamber which may be evacuated as previously indicated. The glass member should have a temperature coefficient of expansion and other characteristics and properties which are suitable to permit the formation of a strong seal between the glass and metal and to withstand the stresses created by temperature changes and vacuum operation to the extent that such conditions are involved.

In summary, it will be seen that this invention provides a new and novel method of joining an inorganic salt crystal to glass through an interconnecting metallic sleeve in a manner whereby the bonding of the metal sleeve to the crystal surface is materially strengthened without resorting to grooving or otherwise weakening the salt crystal. By virtue of the multiple layer composite providing a permanently adhering graded seal between the crystal and the edge of the metal sleeve, an improved salt crystal-to-glass seal construction of increased strength and durability characteristics is obtained.

It is apparent that many widely differing embodiments of this invention may be made without departing from the spirit and scope thereof and it is not intended to be limited except as indicated in the appended claims.

I claim:

1. A sealing joint between a metal member and a salt crystal comprising an inorganic salt crystal having a smooth ungrooved juncture surface, an initial layer on the juncture surface of an easily oxidizable substance capable of providing a metal oxide film which is not readily soluble in silver chloride, an intermediate thin layer of a noble metal selected from the group consisting of silver and gold, and a third layer consisting of silver chloride in which the end portion of a metal member is fused.

2. A joint as defined in claim 1 wherein said metal oxide film is chromium oxide.

3. A sealing joint between a metal member and a salt crystal comprising an inorganic salt crystal having thereon an ungrooved juncture surface, a plurality of sealing layers consisting of an initial thin layer on said juncture surface of a metal oxide film which is substantially insoluble in silver chloride, an intermediate thin layer thereover of a noble metal selected from the group consisting of silver and gold, a final layer of silver chloride, and a metal member having one end fused in said final layer.

4. A joint as defined in claim 3 wherein the metal oxide film is chromium oxide.

5. A joint as defined in claim 3 wherein the salt crystal is lithium fluoride.

References Cited in the file of this patent

UNITED STATES PATENTS

| | | |
|---|---|---|
| 2,543,369 | Kling | Feb. 27, 1951 |
| 2,555,877 | Doran | June 5, 1951 |
| 2,639,833 | Schwarz | May 26, 1953 |